Figure 1:
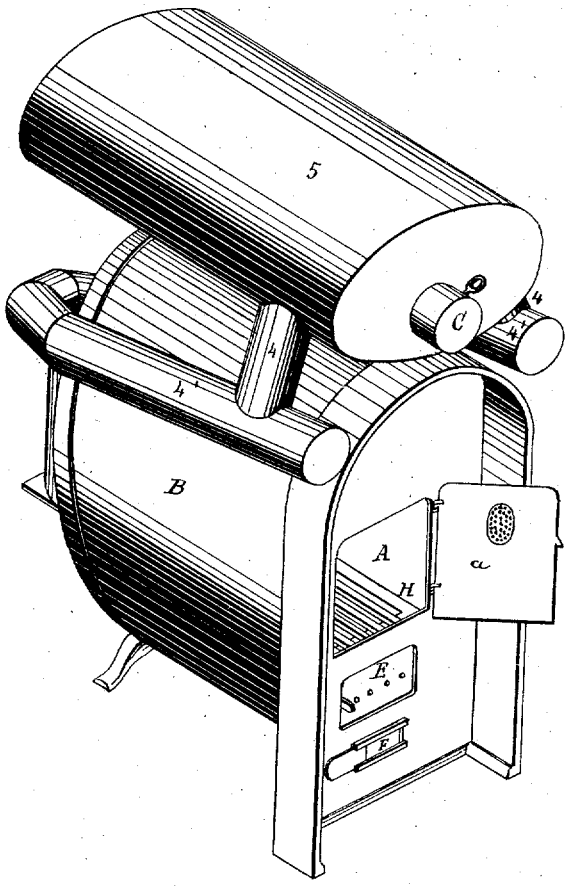
Figure 2:
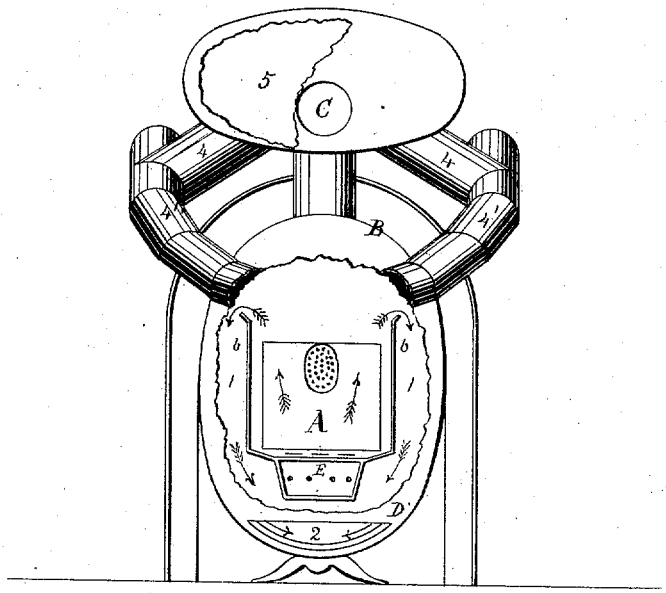
Figure 3:
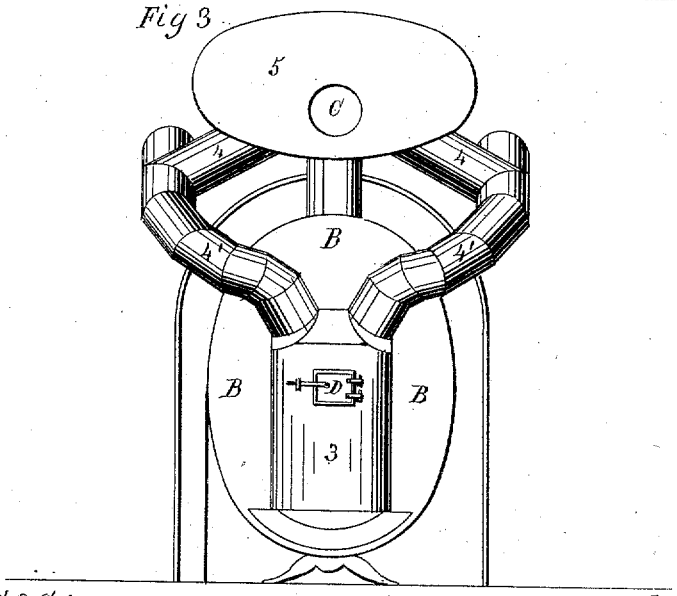

2 Sheets--Sheet 1.

H. RANDALL.

Hot-Air Furnaces.

No. 6,140.

Reissued Nov. 17, 1874.

*Witnesses:*
D. R. Cowl
W. E. Chaffee

*Inventor:*
Henry Randall
by his attys.
Cox & Cox

THE GRAPHIC CO. PHOTO-LITH. 39 & 41 PARK PLACE, N.Y.

2 Sheets--Sheet 2.

H. RANDALL.

Hot-Air Furnaces.

No. 6,140. Reissued Nov. 17, 1874.

*Witnesses:*

D. R. Cowl

W. E. Chaffee

*Inventor:*

Henry Randall by his attys

Cox & Cox

THE GRAPHIC CO. PHOTO-LITH. 39 & 41 PARK PLACE, N.Y.

UNITED STATES PATENT OFFICE.

HENRY RANDALL, OF QUINCY, ILLINOIS.

IMPROVEMENT IN HOT-AIR FURNACES.

Specification forming part of Letters Patent No. 117,814, dated August 8, 1871; reissue No. 6,140, dated November 17, 1874; application filed August 8, 1874.

*To all whom it may concern:*

Be it known that I, HENRY RANDALL, of Quincy, Adams county, Illinois, have invented certain new and useful Improvements in Heating-Furnaces, of which the following is a specification, reference being had to the accompanying drawings.

The invention relates to the construction of a furnace having a combustion-chamber forming a flattened oval in vertical section, and properly supplied with a grate and ash-pit, the object of the invention being to furnish a convenient device for heating, and capable of receiving large masses of fuel at each charge.

No. 1 is a perspective view of a device embodying the elements of the invention. No. 2 is a rear elevation of same, showing the back arrangement of the smoke-conduits. No. 3 is the same, with certain parts broken out to disclose the internal construction.

A, in the accompanying drawings, is the fire-box, having the door *a* of such dimensions as to admit a large mass of fuel at once. The side walls of the box A are formed of fire-brick or other suitable material, which rest against the upright walls *b*, which are separated from the case B by the space 1, the base of the box being formed by the grate H, below which is provided the ash-pit E extending the entire length of the box A. A suitable draft-chamber, F, is provided below the ash-pit, though the pit itself serves the purpose of a draft-conduit. The fire-box A, grate H, ash-pit E, and draft-chamber F are inclosed in the oval cylindrical shell or case B, that part of which above the fire-box A serves as a combustion-chamber, wherein the heat arising is carried by the draft over the side walls *b*, thence downward, through the spaces 1, to the chamber 2 below the draft-chamber; through it, backward, to conduit 3, which leads directly upward to the point when it joins the conduits 4′, which extend upward and forward upon each side, meeting and sustaining the conduits 4, which depend downward and outward from the lower front parts of the drum 5, to which they are joined. The drum extends the whole length of and a suitable distance above the case B, and is provided with the smoke-pipe C to carry the smoke from the drum 5 to the proper outlet.

Preferably, the drum 5 is of the form shown, though other convenient forms will readily suggest themselves.

The products of combustion pass up into the drum through the conduits 3, 4′, and 4, the smoke escaping as aforesaid.

By the above arrangement the conduits 3 4′ 4 and the drum 5 and case B become heating surfaces, whence the heat is radiated by the circular formation of the same.

The device is properly provided with the door D, through which the accumulation of ashes and soot may be removed; also, with the door F, to permit a similar removal of collections between the box A and case B.

I am aware that stoves having oval barrels or cases are old; also, that cases so formed and having a central fire-box in the midst of a filling are not new; but in none of these does the heat act directly upon the case, nor have the products of combustion a passage entirely around the fire-pit and ash-pit. I do not, therefore, claim such as my invention; but What I do claim, and desire to secure by Letters Patent, is—

1. The flue-pipes 4, flues 1, and opening 2 in rear of the chamber B, in combination with the rear shaft 3, side flues 4′, and drum 5, substantially as shown and described.

2. The oval case B, in combination with the fire-box A, open to permit the direct action of the heat upon the case B and allow a free passage of the products of combustion about the entire inner surface of the case, the fire-box being provided with the grate H and ash-pit E, the latter within and elevated above the lower surface of the case, to permit the passage under it of the products of combustion, substantially as shown and set forth.

HENRY RANDALL.

Witnesses:

B. ALDERKAMP,

B. GEISE.